UNITED STATES PATENT OFFICE.

LEWIS E. SAUNDERS AND RAY HILL WHITE, OF NIAGARA FALLS, NEW YORK, ASSIGN ORS TO NORTON COMPANY, OF WORCESTER, MASSACHUSETTS, A CORPORATION OF MASSACHUSETTS.

ALUMINOUS ABRASIVE AND PROCESS OF MAKING SAME.

1,263,710.           Specification of Letters Patent.      Patented Apr. 23, 1918.

No Drawing.      Application filed August 2, 1917. Serial No. 184,111.

*To all whom it may concern:*

Be it known that we, LEWIS E. SAUNDERS and RAY HILL WHITE, citizens of the United States, residing at Niagara Falls, in the county of Niagara and State of New York, have invented certain new and useful Improvements in Aluminous Abrasives and Processes of Making Same, of which the following is a specification.

This invention relates to a novel aluminous abrasive prepared from bauxite, and to the process of preparing the same.

According to the invention we effect a profound modification of the characteristics of the abrasive product as usually prepared by the electric furnace fusion of calcined bauxite. As is well understood in the art, the product prepared by fusing ordinary bauxite, with or without the addition of small proportions of carbon, yields a very tough and strong grain which is excellently adapted for many grinding and cutting operations, but is less suited for certain other operations, such as polishing metals and the like, for which a sufficiently hard but structurally weak grain is required.

We have found that an altogether different type of aluminous abrasive may be prepared from bauxite by adding to the bauxite, prior to the electric furnace fusion, a relatively small proportion of a suitable alkali-metal salt or compound, hereinafter referred to for convenience as an "alkali addition." Although many salts and compounds of the alkali metals, including the sulfates, carbonates, hydroxids, aluminates, etc. of sodium and potassium may be utilized in the process with good results, we prefer to use sodium carbonate in the form of soda-ash.

Our process contemplates in one of its forms a partial purification of the bauxite by the reduction and consequent elimination of more or less of the non-aluminous impurities therein. This is accomplished by the addition to the charge of an amount of carbon proportionate to the desired reducing effect. In this case the alkali addition not only determines the formation of the desired weak grain, as in the case in which no carbon has been added, but it tends also to prevent reduction, by the carbon, of the alumina of the bauxite.

Illustrative examples of our process are as follows:—

We calcine in a rotary kiln and in the usual manner any ordinary bauxite. A typical calcined product may contain for example, in addition to alumina:—

$SiO_2$ ---------------------- 4%
$Fe_2O_3$ --------------------- 7%
$TiO_2$ ---------------------- 3.5%
Moisture ------------------ 0.5%

To this material we add, with thorough incorporation by mixing, a relatively small proportion of soda-ash. The proportion used will vary somewhat according to the percentage of acid oxids ($SiO_2$ and $TiO_2$) in the bauxite, and also according to the character of the effect desired in the product; but we have found that an addition of two to three per cent. of alkali, calculated as $Na_2O$, gives satisfactory results in most cases. The mixture is then melted down in an electric furnace, for example a furnace of the type disclosed in U. S. Reissued Letters Patent No. 13,027, to A. C. Higgins.

The product thus formed has approximately the same chemical composition as the calcined bauxite from which it was derived, containing the normal impurities of bauxite (oxids of silicon, titanium and iron), with the addition of a small proportion, usually in the neighborhood of one per cent. of $Na_2O$. The product is dark gray to black in color, is exceptionally fine-grained, and the abrasive grain or grit is very weak and particularly available for the polishing of metals and such other uses as require a grain of this character.

When the bauxite is of low grade, or when a product of higher purity or alumina-content is desired, we modify the above process as by incorporating with the charge a suitable proportion of carbon, preferably in the form of powdered coke. The carbon may be introduced for example in sufficient quantity to partially reduce to metals the oxids of iron, titanium, and silicon, the commonly occurring impurities. We also incorporate with the charge an amount of soda-ash equivalent to two to three per cent. more or less of $Na_2O$ as described above, and subject the charge to electric furnace fusion in the manner already described.

The product formed in this case possesses the same general crystal character as that produced without the addition of carbon, but is lighter in color, and usually of a characteristic reddish-brown shade. The normal impurities of bauxite are present but in reduced proportion depending on the amount of carbon which has been added. Soda ($Na_2O$) is also identifiable in small proportions in the product prepared by this modification of the process.

In a copending application Serial No. 152,099, filed March 2, 1917, we have pointed out that alkali additions made in small proportions to substantially pure alumina, followed by fusion in the electric furnace, yield a product characterized by the presence of material proportions of alumina in the crystal form which is now known as the beta modification. This transformation of alumina to the beta modification has not been observed to any material degree when the alkali additions are made in small proportions to bauxite, as described herein.

We claim:—

1. An aluminous abrasive derived from bauxite, said abrasive characterized by a fine grain of weak structure, and by the presence therein of a small proportion of alkali, in association with the normal impurities of bauxite.

2. An aluminous abrasive derived from bauxite, said abrasive characterized by a fine grain of weak structure, and by the presence therein of a small proportion of alkali, in association with the normal impurities of bauxite, the latter is lesser proportion relative to the alumina than in the original bauxite.

3. The process of making an aluminous abrasive, comprising incorporating with bauxite a relatively small proportion of an alkali metal compound and fusing the mixture in an electric furnace.

4. The process of making an aluminous abrasive, comprising incorporating with bauxite a relatively small proportion of an alkali-metal compound and carbon, and fusing the mixture in an electric furnace.

In testimony whereof we affix our signatures.

LEWIS E. SAUNDERS.
RAY HILL WHITE.